United States Patent [19]
Bammert et al.

[11] 3,932,996
[45] Jan. 20, 1976

[54] PROCEDURE AND DEVICE SUITABLE FOR THE SPEED CONTROL OF A CLOSED GAS TURBINE PLANT CONTAINING A WORKING MEDIUM CYCLE

[75] Inventors: Karl Bammert; Reinhard Krapp, both of Hannover; Günter Krey, Berenbostel, all of Germany

[73] Assignee: Gutehoffnungshutte Sterkrade Aktiengesellschaft, Germany

[22] Filed: Jan. 24, 1975

[21] Appl. No.: 544,014

[30] Foreign Application Priority Data
Jan. 24, 1974   Germany............................ 2403344

[52] U.S. Cl. ....................... 60/650; 60/660; 60/664
[51] Int. Cl.² ......................................... F01K 25/10
[58] Field of Search ............. 60/650, 682, 644, 660, 60/664, 665, 666, 667

[56] References Cited
UNITED STATES PATENTS
3,512,358   5/1970   Schmidt........................ 60/664 X
3,699,681   10/1972   Frutschi............................ 60/660 X

*Primary Examiner*—Allen M. Ostrager
*Attorney, Agent, or Firm*—McGlew and Tuttle

[57] ABSTRACT

The closed gas turbine plant is fitted with at least one by-pass valve serving as an adjusting member for the working medium cycle, and uses measuring transformers for measuring the working medium cycle high and low pressures as well as the actual and nominal speeds of the turbine. A regulator has a first regulator part including an integrator, and the difference signal, between the speed nominal value and the speed actual value, is processed in this first regulator part. The regulator has a second regulator part in which signals representative of the working medium cycle high pressure and the working medium cycle low pressure are combined in an adding manner and the output signals of the two regulator parts are supplied to a third regulator part which controls the by-pass valve or valves.

11 Claims, 5 Drawing Figures

PROCEDURE AND DEVICE SUITABLE FOR THE SPEED CONTROL OF A CLOSED GAS TURBINE PLANT CONTAINING A WORKING MEDIUM CYCLE

FIELD AND BACKGROUND OF THE INVENTION

The present invention relates to a procedure and a device for the speed control of a closed gas turbine plant containing a working medium cycle, fitted with one or several by-pass valves serving as adjusting members for the working medium cycle, and using measuring transformers for measuring the working medium cycle high and low pressure as well as the actual speed and the nominal speed.

Procedures and devices like these are well known. With these gas turbine plants, the control behavior of the speed control can be improved by introducing to the regulator high and low pressure signals from the gas turbine cycle as auxiliary control values. The hitherto existing plants make use of this possibility in a way that the speed actual signal, the speed nominal signal and the pressure signals are combined in a summation member located before the regulator. The resulting signal is then conducted to a regulator whose behavior is essentially proportional-integral (PI-regulator) and whose exit acts on a by-pass valve serving as an adjusting member (see Bammert, K. and Key, G.: "Dynamic behaviour and control of single-shaft closed cycle gas turbines" = Dynamisches Verhalten und Regelung von einwelligen geschlossenen Gasturbinen, Journal of Engineering for Power, Transactions of the ASME, October 1971, pp.447–453).

As is well known, a PI-regulator changes its output value until the regulator input signal disappears. In case the regulator input signal is combined from several signals, a stationary balance condition (state of inertia) is obtained only when the sum of all regulator input values permanently disappear.

With a closed cycle gas turbine whose performance is controlled by by-passes, a performance modification results in a permanent modification of the high and low pressure. In case the signals of these pressures are supplied on a regulator, they result, after a performance modification in corresponding permanent regulator input signals. With the above described combination of speed and pressure signals, the regulator input value resulting therefrom in the state of inertia can therefor disappear only when the pressure signals are neutralized by a speed signal of a corresponding value. Thus the speed control as described above and being well known shows the disadvantage that a load modification always means a permanent perturbation of the speed as to its nominal value. The result of this is the fact that, with hitherto existing closed cycle gas turbines, the speed, i.e. its nominal value, had to be adjusted by hand until the nominal speed had been restored.

Thus the problem is to find a procedure and a device by which the above described disadvantages could be avoided, and this in a way that, as a final result, the speed is adjusted anew to its nominal value.

SUMMARY OF THE INVENTION

It has been found now that such a procedure and such a device could be realized according to the present invention, when — within a regulator — in a first regulator part having an integrator, only the difference signal between speed actual value and speed nominal value is processed when its output signal is fed — together with the output signal of a second regulator part, which processes the working medium cycle high pressure signal and/or the working medium cycle low pressure signal — in a summarized, way to a third regulator part which controls the by-pass valve or valves. s Moreover, the present invention relates to the following possibility: Within a regulator, the difference signal between actual speed value and nominal speed value, formed in a check place gets fed — as an input signal — to a first regulator fitted with an integrator, and the output signal of the regulator part having an integrator is fed to a check member or to a summation member.

Another possibility of the present invention is the following: Within a regulator, in a second regulator part, the working medium cycle low pressure signal is fed — by means of a signal feed line — to a first amplifier or potentiometer, whereas the working medium cycle high pressure signal is fed to a second amplifier or potentiometer — by means of another signal feed line —; both their output signals are fed — by means of signal feed lines — to a check member where they are subtracted. Then the so formed difference signal is fed — by means of a third signal feed line — to a third amplifier or potentiometer. Finally, the output signal thereof is fed, with the same sign with which the output signal of the second potentiometer or amplifier is supplied to the check member by means of a signal feed line, to a check member or summation member by means of a signal feed line.

In a further development of the present invention means that, in the regulator, within the second regulator part, the amplifications within the first and second amplifier or potentiometer are selected in a way such that the output signal of a check member positioned behind them, at the nominal working point of the gas turbine plant, become zero when the by-pass valves are closed.

Furthermore, the present invention relates to the possibility that within the regulator, in the second regulator part, only one of the two working medium cycle pressure signals is fed — by means of a signal feed line — to an amplifier or potentiometer, and that the output signal of the latter is fed by means of a signal feed line to a check member or summation member, viz. with positive sign when the high pressure signal is processed and with negative sign when the low pressure signal is processed.

Another aspect of the present invention is a device for a procedure suitable for the speed regulation of a closed gas turbine plane containing a working medium cycle, with one or several by-pass valves acting as adjusting members for the working medium cycle, and using measuring transformers for measuring the working medium cycle high pressure and the working medium cycle low pressure as well as the actual speed and the nominal speed and regulator consists of three regulator parts which are connected with each other by means of a check member or summation member. The first regulator part possesses an integrator, and the input (entry) of the first regulator part is connected — via a signal feed line — with the output (exit) of a check member to which, via another signal feed line the actual speed value signal and, via another signal feed line the nominal speed value signal are fed. The second regulator part consists of three amplifiers or potentiometers and a check member. By means of a signal feed line, the working medium cycle low pressure signal is fed to the input of the first amplifier or potentiometer, and the working medium cycle high pressure signal is fed to the input of the second amplifier or potentiometer by means of another signal feed line, whereas the check member is connected — by other signal feed lines with the outputs of the amplifiers or potentiometers and — by means of a signal feed line — with the input of the third amplifier or potentiometer. The third regulator part is a P-regulator, and all the three regulator parts are connected to the check or summation member via signal feed lines, and; there is a signal feed line between the P-regulator and the by-pass valve or valves.

In this connection, the present invention relates to the second regulator part consisting of only one amplifier or potentiometer, to which is directly conducted either the working medium cycle low pressure signal or the working medium cycle high pressure signal, in both cases by means of a signal feed line.

For an understanding of the principles of the invention, reference is made to the following description of typical embodiments thereof as illustrated in the accompanying drawings.

DESCRIPTION OF THE PREFERRED EMBODIMENT

Figure 1:
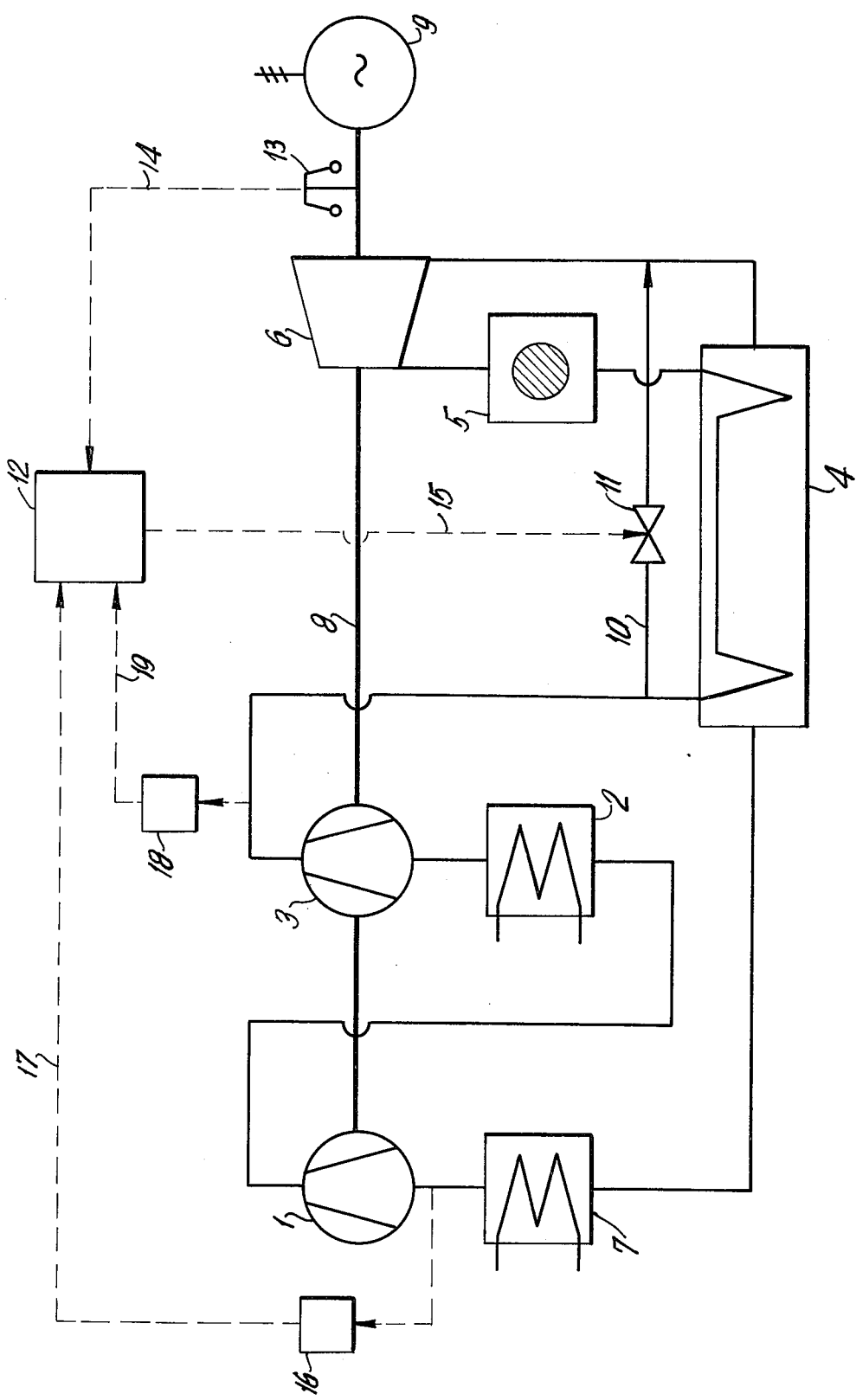
FIG. 1 - shows in a diagrammatic view and a gas turbine plant.

FIG. 1 shows a gas closed cycle turbine plant in a diagrammatic view. The working medium (for instance air, helium, $CO_2$) it sucked in by the low pressure compressor 1. It is compressed there to the intermediate pressure, after which it is re-cooled in the intermediate cooler (intercooler) 2 in order to be compressed to the maximum process pressure in the high pressure compressor 3. The working medium then is pre-warmed in the heat exchanger 4, whereafter it enters the heater or reactor 5 in which it is heated up to the maximum process temperature. The gas is then released in the turbine 6. In the heat exchanger 4, the gas gives off part of its waste heat to the high pressure gas in order to be cooled again — in the pre-cooler 7 — down to the low pressure compressor input temperature. The turbine 6 drives — by means of the shaft or spindle 8 — both the compressors 1 and 3 as well as the generator or a working machine 9.

The by-pass 10 with the by-pass valve 11 controls the machine speed or the performance itself. This by-pass branches behind the high pressure compressor 3 and ends either — see FIG. 1 — between turbine 6 and heat exchanger 4 or between heat exchanger 4 and pre-cooler 7.

The machine speed is regulated by the regulator 12, to which the speed signal produced in the speed transformer 13 of the spindle 8 is fed (conducted) by means of the signal feed line 14 and the output signal of which acts on the by-pass valve 11 by means of the signal feed line 15. As is explained above, the regulator 12 has supplied thereto two other input signals, namely the signal produced in the pressure gauge transformer 16 via the signal feed line 17 — the pressure gauge transformer 16 measures the pressure at an appropriate point on the low pressure side of the cycle (for instance before the low pressure compressor 1) — , and the signal produced in the pressure gauge transformer 18 via the signal feed line 19, the pressure gauge transformer 18 measuring the pressure at an appropriate point on the high pressure side of the cycle (for instance behind the high pressure compressor 3.

Figure 2:
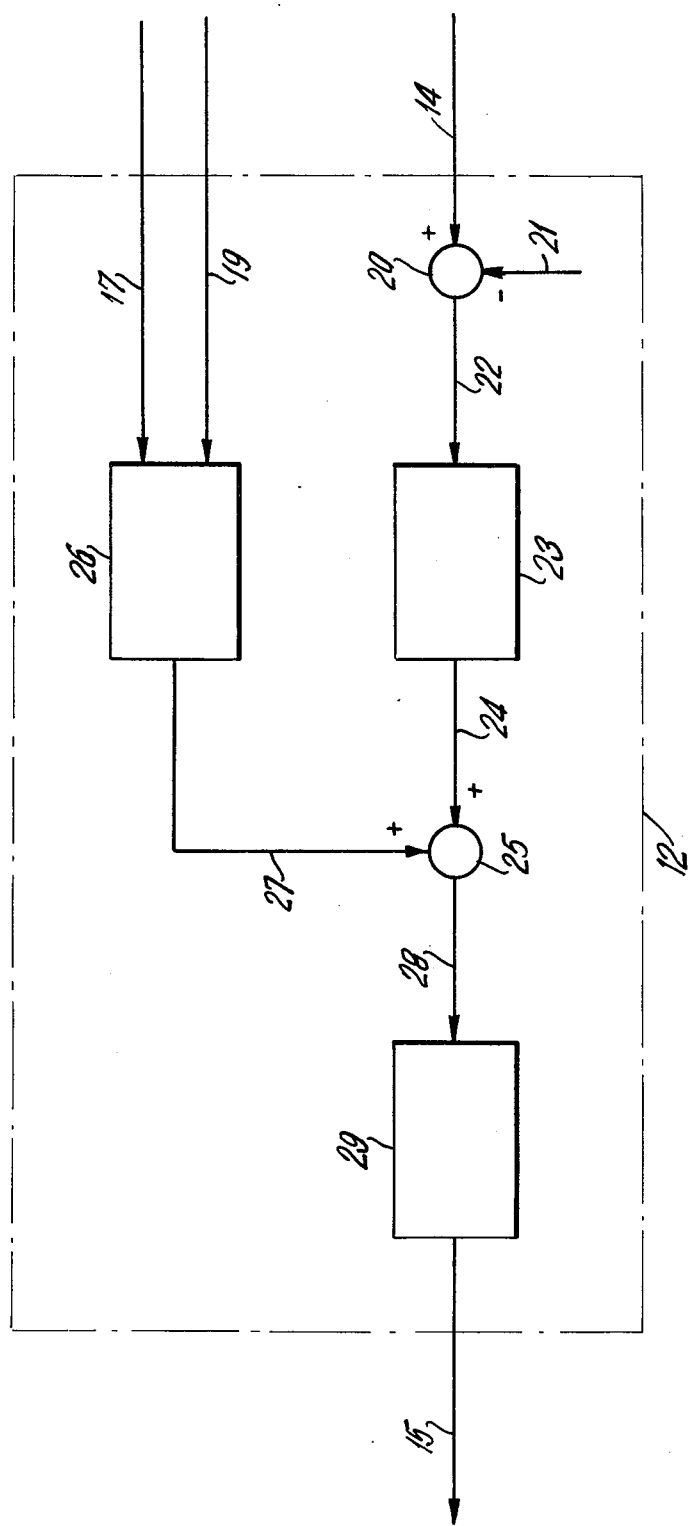
FIG. 2 - shows the principal of the regulator according to the present invention, FIG. 3 - shows a regulator in accordance the hitherto existing level of technique, FIG. 4 - shows another possibility as to the regulator according to the present invention, FIG. 5 - shows a comparison between the speed control of the hitherto existing technique and that of the present invention.

FIG. 2 shows the inner construction of the regulator 12. The speed signal (actual value) fed to the regulator by means of the signal feed line 14 first is compared — in the check space 20 — to the nominal value of the speed supplied through the signal feed line 21. The difference signal between actual and nominal value then is conducted — by means of the signal feed line 22 — to the first regulator part 23, which possesses an integrator. Its output signal is conducted (fed) by means of the signal feed line 24 to the check and summation member 25. The pressure signals first arrive — through the signal feed lines 17 and 19 — at the second regulator part 26 connected in parallel with regulator part 23. The output signal of regulator part 26 is also conducted to the check and summation member 25 by means of the signal feed line 27. The addition realized in the check and summation member 25, i/e. addition of both the signals, results in an output signal which is speed dependent as well as pressure dependent. This output signal is fed — by means of the signal feed line 28 — to the third regulator part 29, which essentially contains the adjusting drive of the by-pass valve, and the output signal of which is conducted — by means of the signal feed line 15 — to the by-pass valve 11, determining the size of the valve lift. It is sufficient when the regulator part 29 shows a proportional behavior.

Figure 3:
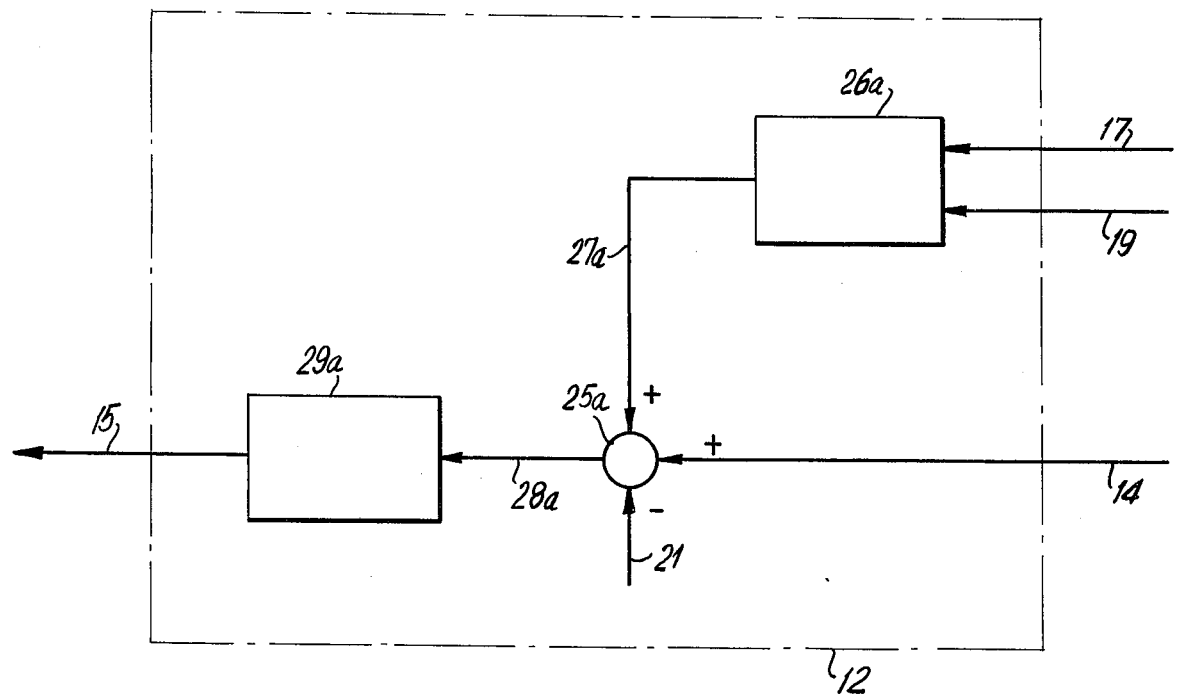

As compared to FIG. 2, FIG. 3 shows the construction of a regulator 12 according to the hitherto existing level of technique. This figure clearly shows the fact that hitherto — in the check or summation member 25a — the actual speed signal 14 and the nominal speed signals 21 as well as the pressure signals transformed in the regulator part 26a to the signal 27a are summed up, and that the resulting signal 28a is fed to the regulator part 29a, which contains the adjusting drive of the by-pass valve and the behavior of which is a proportional-integral one. The output signal 15 of the regulator part 29a determines the lift of the by-pass valve. This means that — within the regulator part 29a containing the integrator — it is not only the difference signal between actual speed value and nominal speed value which is processed but, on the contrary, a signal 28a composed by the speed and pressure signals.

The difference between the present invention and the hitherto existing level of technique is essentially the fact that the regulating system according to the present invention shows the following characteristics:

1. There is a separate regulator part 23 which includes an integrator.

2. In the regulator part 25, which includes an integrator, only the difference signal between the actual speed value and the nominal speed value is processed.

3. One or both of the pressure signals is introduced behind the regulator part 23, including an integrator, and not before.

4. The regulator part 29, which contains the adjusting drive of the by-pass valve, need only show proportional behavior and not proportional-integral behavior.

Figure 4:
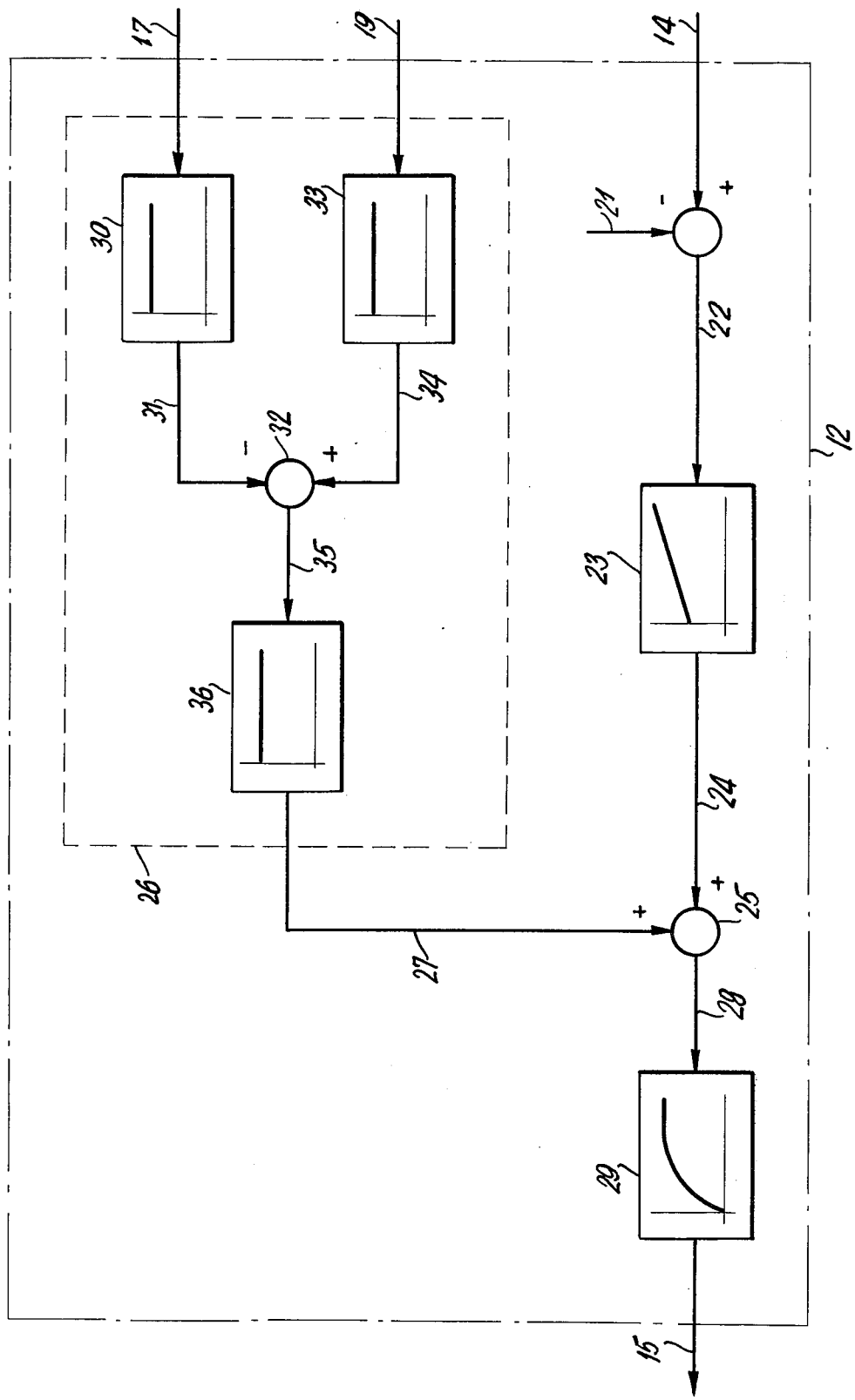

FIG. 4 shows an execution example of the regulating system according to the present invention, in which the first regulator part 23 is formed by a normal regulating component with proportional-integral behavior.

In order to give an example, the second regulator part 26 shows the following execution:

The low pressure signal first gets arrives over the signal feed line 17 to the amplifier or potentiometer 30, the output signal of which — by means of the signal feed line 31 — is conducted with negative sign to the check member 32. In the same manner, the high pressure signal is conducted — through the signal feed line 19 — first to the amplifier or potentiometer 33, the output signal of which is conducted with positive sign to the check member 32 by means of the signal feed line 34. The signal produced in the check member 32 is supplied — through the signal feed line 35 — to the amplifier or potentiometer 36, the output signal of which is identical to that of the regulator part 26. The signs of both the signals in the signal feed lines 31 and 34 at the check member 32 may be interchanged. In this case however the sign of the signal in the signal feed line 27 at the check or summation member 25 must be changed, too.

The behavior of the third regulator part 29 is here to be classified as proportional; generally there are retardations produced by the adjusting drive.

A change of the pressure level, by reducing or increasing the gas quantity circulating within the gas turbine cycle, modifies the pressure signals, viz. in a way such that the percentual changes of their values remain the same. In case the pressure signals are intensified in the amplifiers or potentiometers 30 and 33 in a way such that — at the nominal working point of the gas turbine plant (with nominal temperatures, nominal pressures, nominal speed and closed by-pass valve) — the output signal of the check member 32 and therefore the output signal of the amplifier potentiometer 36 become zero, the result is that the speed regulation is independent from the pressure level in the cycle.

The regulation dynamic however will not be disrupted when — at the nominal working point of the gas turbine plant — the signal in the signal feed line 27 is other than zero. As moreover the pressure signals in the signal feed lines 17 and 19 generally show a nearly similar temporary process, it is often enough to introduce only one of the two pressure signals into the regulator 12. In this case, the regulator components 30 to 35 as well as one of the two pressure gauge transformers 16 or 18 may be eliminated and only one pressure signal may be fed via the signal feed line 17 or 19 directly to the amplifier or potentiometer 36.

Figure 5:
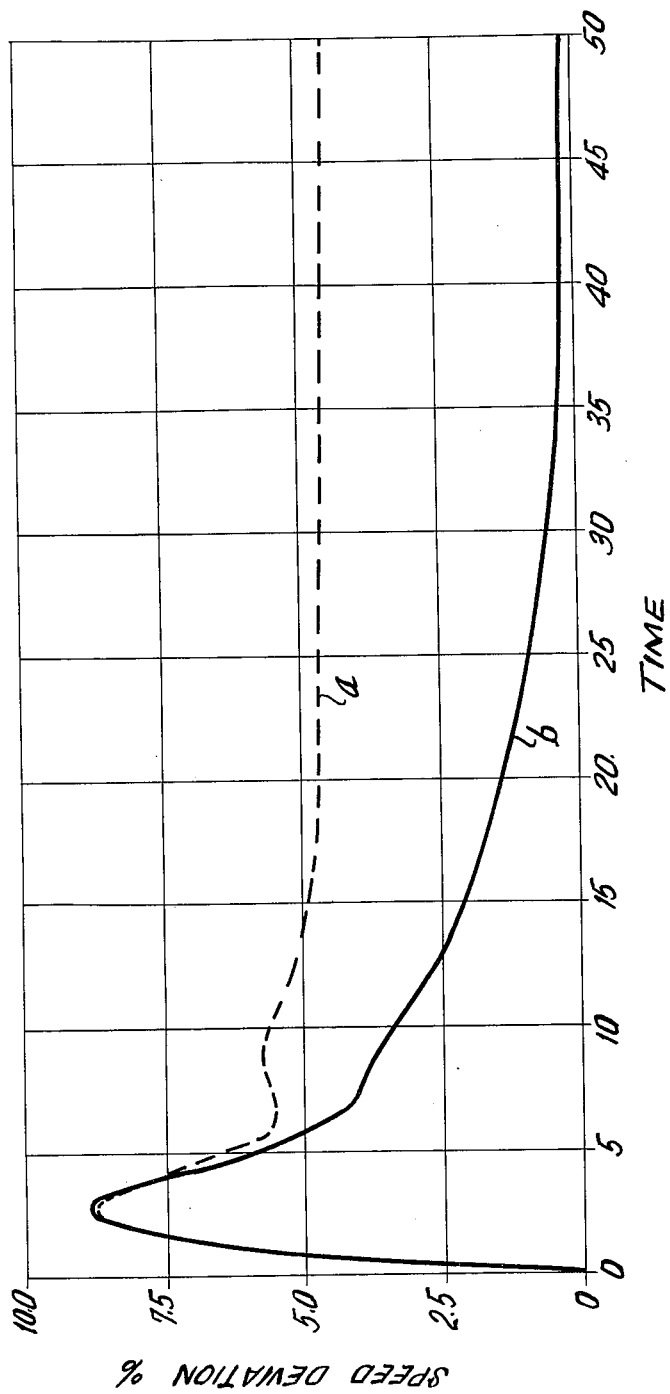

FIG. 5 shows the results of comparing a system according to the present invention and a system according to the hitherto existing state of technique. The deviation of speed from its nominal value is shown in relation to time. At time zero, a full load dumping is presumed which results in a speed increase. By opening the by-pass valve (FIG. 1) the speed then comes under control and adjusted. In case the by-pass valve is fitted and operated with a regulator according to the hitherto existing level of technique, there will be the speed process shown by curve a.

The graph of FIG. 5 shows that the speed deviation tends to a limit value of about 4.3 percent. When using a procedure according to the present invention for speed regulation of the closed cycle gas turbine, the speed process shown in curve b is obtained. Contrarily to curve a, curve b approaches the limit value zero.

All this shows that the present invention relating to the speed regulation of a closed gas turbine plant combines the well known advantages of pressure introduction with the possibility to adjust the speed to its nominal value without permanent deviation.

We claim:

1. Procedure for the speed control of a closed cycle gas turbine plant containing a working medium, having at least one by-pass valve serving as an adjusting member for the working medium cycle, and using measuring transformers for converting the high pressure and the low pressure of the working medium cycle into a high pressure signal and a low pressure signal, respectively, and for converting the actual speed and the nominal speed into an actual speed signal and a nominal speed signal, respectively, said procedure comprising the steps of processing, in a first regulator part, only the difference signal between the actual speed signal and the nominal speed signal to provide a first output signal; processing, in a second regulator part, the high pressure signal and the low pressure signal to produce a second output signal; combining the first and second output signals to provide a summation signal; supplying the summation signal to a third regulator part as an input signal; and utilizing the output signal of the third regulator part to adjust the by-pass valve to control the working medium cycle.

2. Procedure according to claim 1, including combining the actual and nominal speed signals in a check member to provide a difference signal; supplying the difference signal to the first regulator part for processing; and forming the summation signal, supplied to the third regulator part, in a summation member having said first and second outputs as its inputs and having its output supplied to the third regulator part.

3. Procedure according to claim 2, including the steps of, in the second regulator part conducting the low pressure signal over a first signal feed line to a first intensifying member, conducting the high pressure signal over a second signal feed line to a second intensifying member, supplying the outputs of the first and second intensifying members over respective signal feed lines to a subtraction member, and supplying the output of the subtraction member over a further signal feed line to a third intensifying member with the same polarity sign as that of the output signal supplied from the second intensifying member to the subtraction member; the output of the third intensifying member constituting said second output signal.

4. Procedure according to claim 3, in which amplifiers are used as the intensifying members.

5. Procedure according to claim 3, in which potentiometers are used as the intensifying members.

6. Procedure according to claim 3, including selecting the intensifications in the first and second intensifying members so high that the output signal of the subtraction member becomes zero at the nominal working point of the gas turbine plant and while the by-pass valves are closed.

7. Procedure according to claim 3, including the steps of supplying only one of the two working medium cycle pressure signals to the third intensifying member; supplying the second output signal from the third intensifying member to the summation member with positive polarity when the high pressure signal is processed in the second regulator part and with negative polarity when the low pressure signal is processed in the second regulator part.

8. Device according to claim 3, in which said second regulator part consists of only a single intensifying member; and a single signal feed line connected to the input of said single intensifying member and selectively operable to supply thereto either the low pressure signal or the high pressure signal.

9. In a device for controlling the speed of a closed cycle gas turbine plant containing a working medium cycle and having at least one by-pass valve serving as an adjusting member for the working medium cycle, including respective measuring transformers for converting the working medium cycle high pressure into a high pressure signal and the working medium cycle low pressure into a low pressure signal, the actual speed value into an actual speed signal and the nominal speed value into a nominal speed signal: the improvement comprising, in combination, a regulator consisting of first, second and third regulator parts; a summation member connected to the outputs of said first and second regulator parts and to the input of said third regulator part; said first regulator part including an integrator; a comparison member; respective signal feed lines supplying the speed actual value signal and the speed nominal value signal to said comparison member; means connecting the output of said comparison member to the input of said first regulator part; said second regulator part consisting of first, second and third intensifying members and a subtraction member; respective signal feed lines connecting the outputs of said first and second intensifying members to said subtraction member and the output of said subtraction member to the input of said third intensifying member; a first signal feed line supplying the low pressure signal to the input of said first intensifying member; a second signal feed line supplying the high pressure signal to the input of said second intensifying member; said third regulator part being constituted by a P-regulator; said third intensifying member being connected to said summation member; and an output signal feed line connecting said third regulator part to said at least one by-pass valve to control the opening thereof.

10. Device according to claim 9 in which said intensifying members are amplifiers.

11. Device according to claim 9 in which said intensifying members are potentiometers.

* * * * *